United States Patent [19]

Tsujimoto

[11] Patent Number: 4,679,196
[45] Date of Patent: Jul. 7, 1987

[54] SEMICONDUCTOR MEMORY DEVICE WITH A BIT ERROR DETECTING FUNCTION

[75] Inventor: Jun-ichi Tsujimoto, Yokohama, Japan

[73] Assignee: Kabushiki Kaisha Toshiba, Kawasaki, Japan

[21] Appl. No.: 705,788

[22] Filed: Feb. 26, 1985

[30] Foreign Application Priority Data

Mar. 1, 1984 [JP] Japan ................................. 59-39507

[51] Int. Cl.⁴ .............................................. G06F 11/10
[52] U.S. Cl. ......................................... 371/51; 371/50; 364/200; 364/900
[58] Field of Search ........................... 371/49, 50, 51; 364/200 MS File, 900 MS File

[56] References Cited

U.S. PATENT DOCUMENTS

| | | | |
|---|---|---|---|
| 3,599,146 | 8/1971 | Weisbecker | 371/51 |
| 3,806,716 | 4/1974 | Lahti | 371/51 |
| 4,355,393 | 10/1982 | Kubo | 371/51 |
| 4,365,332 | 12/1982 | Rice | 371/50 X |
| 4,371,963 | 2/1983 | Edwards | 371/50 |
| 4,453,251 | 1/1984 | Osman | 371/50 X |
| 4,456,980 | 6/1984 | Yamada | 371/50 |
| 4,464,755 | 8/1984 | Stewart | 371/51 |

OTHER PUBLICATIONS

Tsuneo Mano, et al., "Submicron VLSI Memory Circuits," IEEE International Solid-State Circuits Conference, ISSCC, 2/25/83.

Osman, "Error-Correcting Technique for Random-Access Memories," IEEE Journal of Solid-State Circuits, vol. SC-17, No. 5, 10/82.

*Primary Examiner*—Jerry Smith
*Assistant Examiner*—Robert W. Beausoliel, Jr.
*Attorney, Agent, or Firm*—Finnegan, Henderson, Farabow, Garrett and Dunner

[57] ABSTRACT

A memory matrix array consists of a plurality of memory cells with addresses expressed by a plurality of bits. The parity bit for the data stored in all of the memory cells of each linear memory cell array in the row direction are stored in the corresponding one of a plurality of parity storage cells. Storage is made into second and third parity storage cells, respectively, the parity bits for the data stored in all of the memory cells which are specified such that the corresponding bits of the addresses of the memory cells in the memory matrix array are high in logical level. In a read mode, the parity is read out from the first to third parity storage cells of the parity memory circuit.

6 Claims, 5 Drawing Figures

SEMICONDUCTOR MEMORY DEVICE WITH A BIT ERROR DETECTING FUNCTION

BACKGROUND OF THE INVENTION

This invention relates to a semiconductor memory device with a bit error detecting function for detecting a bit error correction.

As far as we know, there are no RAMs being mass produced and marketed or under development, which can detect a bit error in a semiconductor chip and correct the detected error.

In recent microfabricated semiconductor memory devices, the constituent elements have been remarkably reduced in size, and their package density has been increased. Further, the amount of charge stored as data is minimal. The data stored therein is sensitive to external rays such as $\alpha$ rays, accordingly. As a result, this creates a serious soft error problem. Thus, bit error due to $\alpha$ rays, for example, can easily occur in the high package density memory device. If the bit error occurs, it is, of course, necessary to detect and correct it.

A typical conventional detecting and correcting system of one bit error will be given in brief, referring to FIG. 1. In the figure, a plurality of memory cells 1, each for storing one bit, are arrayed in a vertical (Y) direction and a horizontal (X) direction into a matrix memory cell array 2. In addition to the memory cell array 2, a first parity memory circuit 4 is provided, which consists of a plurality of parity storage cells 3 for storing parity bits for the horizontally arrayed memory cells of the memory cell array 2. A second parity memory circuit 6 is further provided, which consists of a plurality of parity storage cells 5 for storing parity bits for the vertically arrayed memory cells of the memory cell array 2.

With such an arrangement, for storing data into the memory cells 1 of the memory cell array 2, parity bits are successively obtained for the data of all of the memory cells 1 of the memory cell array 2, row by row. The parity bits obtained are respectively stored into the corresponding parity storage cells 3 of the first parity memory circuit 4. Similarly, the parity bits of all of the data in the memory cells 1 arrayed of the memory cell array 2 are obtained column by column. The parity bits obtained are respectively stored into the corresponding parity storage cells 5 of the second parity memory circuit 6.

For reading out data from the memory cells 1 of the memory cell array 2, the parity bits in the corresponding parity storage cells 3 of the first parity memory circuit 4 are read out. The parity bit preset in the parity storage cell 5 in the second parity memory circuit 6 is read out. Then, the data read out from the memory cell 1 is parity-checked using the parity bits readout. Namely, it is checked as to whether or not an error is contained in the readout data. When a data error is detected, it is decided that a bit error has occurred, and the data readout of the erroneous memory cells 1 is level-inverted and corrected.

As another known method for detecting and correcting a bit error of up to two bits, an address computer is used.

The memory device shown in FIG. 1 can correct the bit error of only one bit. Further, it requires data-readout bit lines for receiving data read out from the memory cells 1; one for vertical and the other for horizontal. Thus, additional bit lines for the vertical or horizontal must be provided in a design of a general type of semiconductor memory device in which word lines are provided in one direction, and bit lines only in the other direction. This conventional memory device makes the manufacturing process more complicated.

In the case of the bit error detecting/correcting method using the address computer, when it is applied to the semiconductor memory device, a design of the memory device to be employed is quite different from that of the conventional one which causes great difficulty. Further, it is necessary to compute the addresses in the semiconductor memory chip, consuming a long period of time.

SUMMARY OF THE INVENTION

Accordingly, an object of the present invention is to provide a semiconductor memory device with a bit error detecting function which requires a design different from that of the conventional semiconductor memory device with no further complications in process manufacturing and having a simple structure.

According to one aspect of the present invention, there is provided a semiconductor memory device with a bit error detecting function having a data memory circuit including a plurality of memory cells which are arrayed in the X and Y directions in a matrix fashion, the plurality of memory cells respectively having addresses expressed by a plurality of bits, characterized by a parity memory circuit including a plurality of parity storage cells for storing parity bits which are provided for the data stored in the memory cells of the memory cell array in the X and Y direction, the memory cells being specified such that the corresponding bits of the addresses of the memory cells are at the same logical level.

DETAILED DESCRIPTION OF THE PREFERRED EMBODIMENTS

Figure 2:
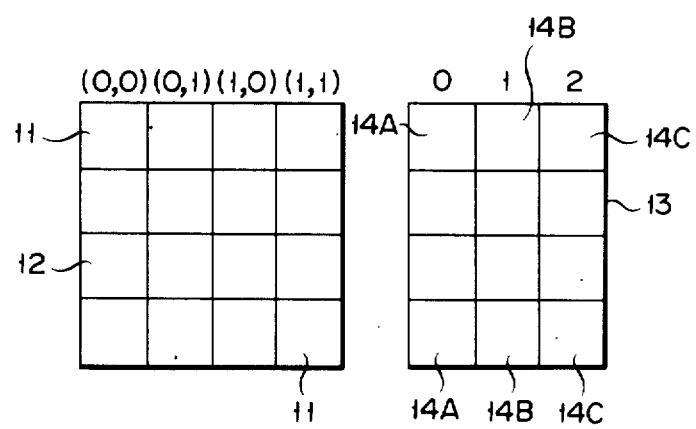
FIG. 2 is a block diagram showing an arrangement of a semiconductor memory device which is an embodiment of the present invention.

Reference is made to FIG. 2 illustrating in block form an arrangement of a device capable of detecting and correcting one bit error into which the present invention is applied.

In FIG. 2, reference numeral 11 designates memory cells to and from which one bit data can be written and read out. These memory cells 11 can be referred to as data cells to distinguish from memory cells used to store parity information and are matrixed into a 4×4 memory cell array 12 with a memory capacity of 16 bits. The memory cells 11 in the memory cell array 12 are each addressed by a horizontal address X and a vertical address Y. Usually, an address of the memory device is expressed by a binary number. For example, the horizontal and vertical addresses X and Y are respectively expressed by logic combinations of m and n bits, such as (x1, x2, . . . xm) and (y1, y2, . . . , yn). In this embodiment, four bits are contained in each row and each column of the memory cell array. Then, m=n=2. The logic combinations of the horizontal address X=(x1, x2) are as shown in FIG. 2: the horizontal address (x1, x2) of the memory cells 11 on the leftmost side is (0, 0), and that on the rightmost side is (1, 1).

This embodiment is further provided with a parity memory circuit 13. The parity memory circuit 13 includes four sets of parity storage cells 14A, 14B and 14C designated respectively as parity storage bits 0, 1, and 2 arrayed in rows in the parity cell array 13. The number of the parity storage cell sets correspond to the number of rows of data cells 11 in the memory cell array 12. In this embodiment, it is four, as just mentioned.

Of the three cells of each parity storage cell set, the parity storage cell 14A at the 0th bit in each set stores a parity bit corresponding to the data stored in the four data cells 11 in the corresponding row in the memory cell array 12. Each of the parity storage cells 14B designated as parity storage bit 1 in each set stores a parity bit corresponding to the data stored in the two data cells 11 arrayed in the corresponding row in the memory cell array 12 that have the same predetermined logic value for a selected one of the two bits required to identify the horizontal address $(X_1, X_2)$ of each data cell in a row. In this case, the logical state of the x2 bit of the horizontal address X is used to identify which two data cells in each row will correspond to parity storage bit 1 in each set, such as by requiring the logical state of the $X_2$ horizontal address bit of the two corresponding data cells to be equal to "1". Each of the parity storage cells 14C designated as parity storage bit 2 stores a parity bit corresponding to the data stored in the two of the four data cells 11 that have the same predetermined logic value for a selected one of the horizontal address bits for those data cells in the corresponding row in the memory cell array 12. In this case, the logical state of the x1 horizontal address bit will be a "1" in the two selected data cells.

In reading out data from a selected row of data cells in the memory cell array 12 by addressing it, a parity generating circuit (FIG. 5) produces three parity bits, which are defined in an identical manner to the three parity storage bits contained in each set of parity storage cells 14, in association with the cell data in the data cells in the selected row, the row containing that cell 11 from which the data is to be read out. At the same time, there is a readout of the three parity bits preset in a set of the parity storage cells 14A–14C in the parity memory circuit 13, which parity bits correspond to the data stored in the four memory cells 11 arrayed in the selected row, which row includes the memory cell 11 of which the data is to be read out. Then, the generated three parity bits are respectively compared with the parity storage bits read out from the parity storage cells. By comparison, it is checked whether or not both the parities are coincident with each other, bit by bit.

It is assumed that the horizontal address X=(x1, x2) for the data readout is (0, 0), and that a bit error occurs in the data readout of the memory cell 11 as specified by this address. In this case, of the three parity bits newly generated at the time this data is read out from data cells in the selected row, the generated parity storage bit 0 is not coincident with the 0th bit of the preset and stored parity bits read out of the parity memory circuit 13.

Further, it is assumed that the input address X=(x1, x2) is (0, 1), and a bit error occurs in the data readout of the memory cells 11. At this time, of the three parity bits newly generated at the time of reading out data, the 0th bit and the 1st bit are not coincident with the corresponding ones of the parity bits read out of the parity memory circuit 13, respectively.

It is further assumed that the input address X=(x1, x2) is (1, 0), and that a bit error occurs in the data readout of the memory cells 11 as specified by this address. In this case, of the three parity bits, the 0th bit and the 2nd bit are not coincident with the corresponding ones of the parity bits read out of the parity memory circuit 13, respectively.

It is further assumed that the input address $X=(X_1, x_2)$ is (1, 1), and a bit error occurs in the data readout of the memory cells 11 as specified by this address. At this time, the parity bits 0, 1, and 2 of the parity as newly generated are not coincident with the three corresponding parity storage bits read out of the parity memory circuit 13, respectively.

When a bit error occurs, a bit pattern of the three parity bits changes depending on a logic state of a memory cell malfunctioning from the bit error, which is one of the four memory cells in each row of the memory cell array 12. Then, in reading out data, the three parity bits for the readout data are generated. At the same time, three parity bits are read out of the parity memory circuit 13. The generated parity bits are respectively compared with the read out parity bits for the parity check. Through the parity check, the bit error check can be made for the one-bit memory cells 11 of the memory cell array 12.

When a bit error is detected in such a way, if the level of the data readout of the memory cell 11 is inverted, a correct level of the data is obtained, resulting in the bit error correction.

In designing an actual semiconductor memory device based on this embodiment, for generating the parity bits, it is sufficient to read out the cell data from the memory cell array 12 using bit lines extending only in the vertical or column direction. The memory cell array 12 requires the bit lines extend only in the vertical direction. Therefore, a design of this semiconductor memory device is different from that of the conventional one. It is possible to avoid making the manufacturing process more complicated.

Figure 3:
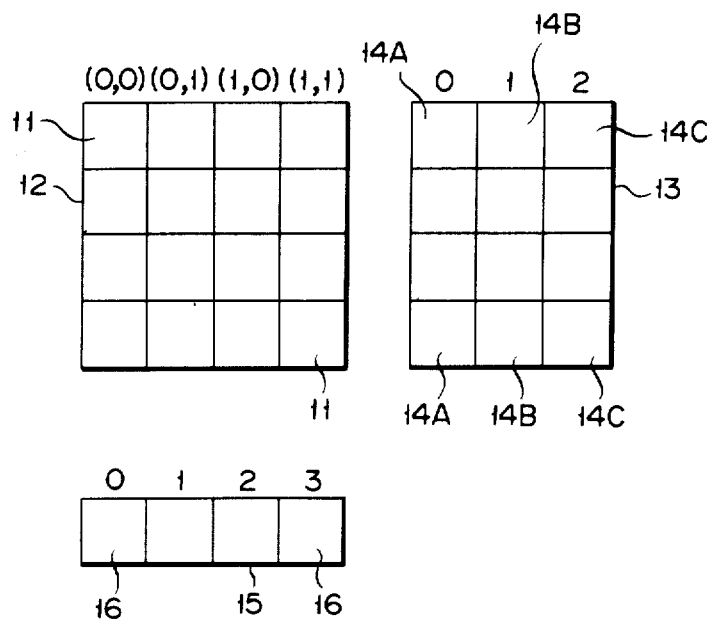
FIG. 3 is a block diagram of an arrangement of a semiconductor memory device which is another embodiment of the present invention.

FIG. 3 shows a block diagram of a device for detecting and correcting a 2-bit error into which the semiconductor memory device of the present invention is applied.

In the second embodiment, another parity memory circuit 15 is additionally provided in the FIG. 2 device.

The parity memory circuit 15 is provided with parity storage cells 16 of which the number is equal to the number of columns of the data cells 11 in the memory cell array 12. The parity storage cells 15 at the 0th to 3rd bits respectively store parity bits corresponding to the data stored in all of the data cells 11 in each of the columns of the memory cell array 12.

Figure 4:
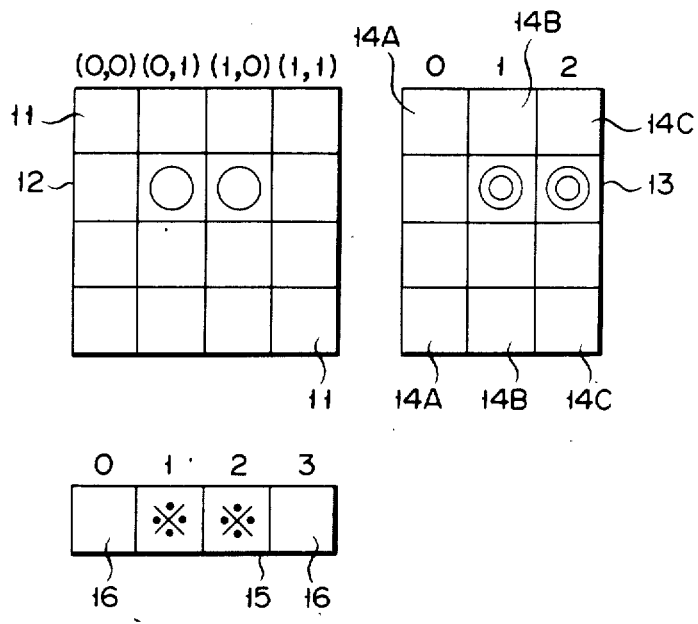
FIG. 4 is a block diagram useful in explaining the operation of the FIG. 3 device.

In the memory device thus arranged, the parity check when the data is read out is similar to that in the FIG. 2 device. A bit error correction of up to 2 bits can be made due to the parity checks for both the horizontal and the vertical directions. For example, as shown in FIG. 4, it is assumed that a bit error occurs at the two memory cells 11 (circled in the figure) of which the horizontal addresses X=(x1, x2) are (0, 1) and (1, 0). In this case, as for the parity bits 0, 1, and 2 for the horizontal rows which are generated at the time of the data readout, the contents in the parity storage cells 14B and 14C (double circled in the figure) at the parity storage bits 1 and 2 for the corresponding row in the parity memory circuit 13 are different from the contents of the generated parity bits 1 and 2 for that corresponding row. Further, as for the parity bit corresponding to the data stored in the data cells in each corresponding vertical column that is generated at the time of data readout, the contents of the two parity storage cells 16 (located at the positions marked by in the figure) in the parity memory circuit 15 are different from the contents of the corresponding vertical parity bits generated during readout.

In this memory device, the bit error up to two bits can be detected and corrected by comparing the parity bits stored in the circuits 13 and 15 with those generated at the time of the data readout.

Figure 1:
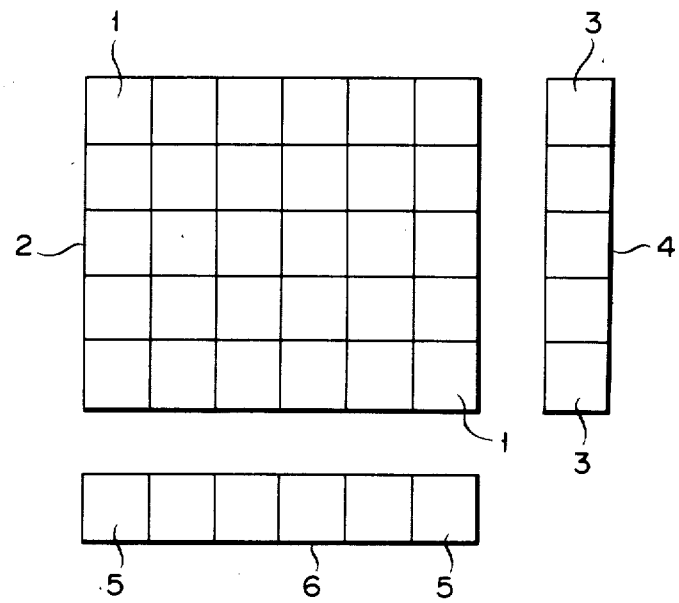
FIG. 1 is a block diagram showing an arrangement of a conventional semiconductor memory device.

In the FIG. 3 embodiment, like the conventional memory device shown in FIG. 1, in the memory cell array 12, the bit lines for reading out the data for generating parity bits must be provided for both the horizontal and vertical directions. It is noted, however, that the bit error of two bits can be corrected with the manufacturing process being no more complicated than that in the one-bit error correction. Further, the design of the current semiconductor memory device can be used with mimimal modification.

The parity check used in the above-mentioned embodiments may be even or odd parity check.

Figure 5:
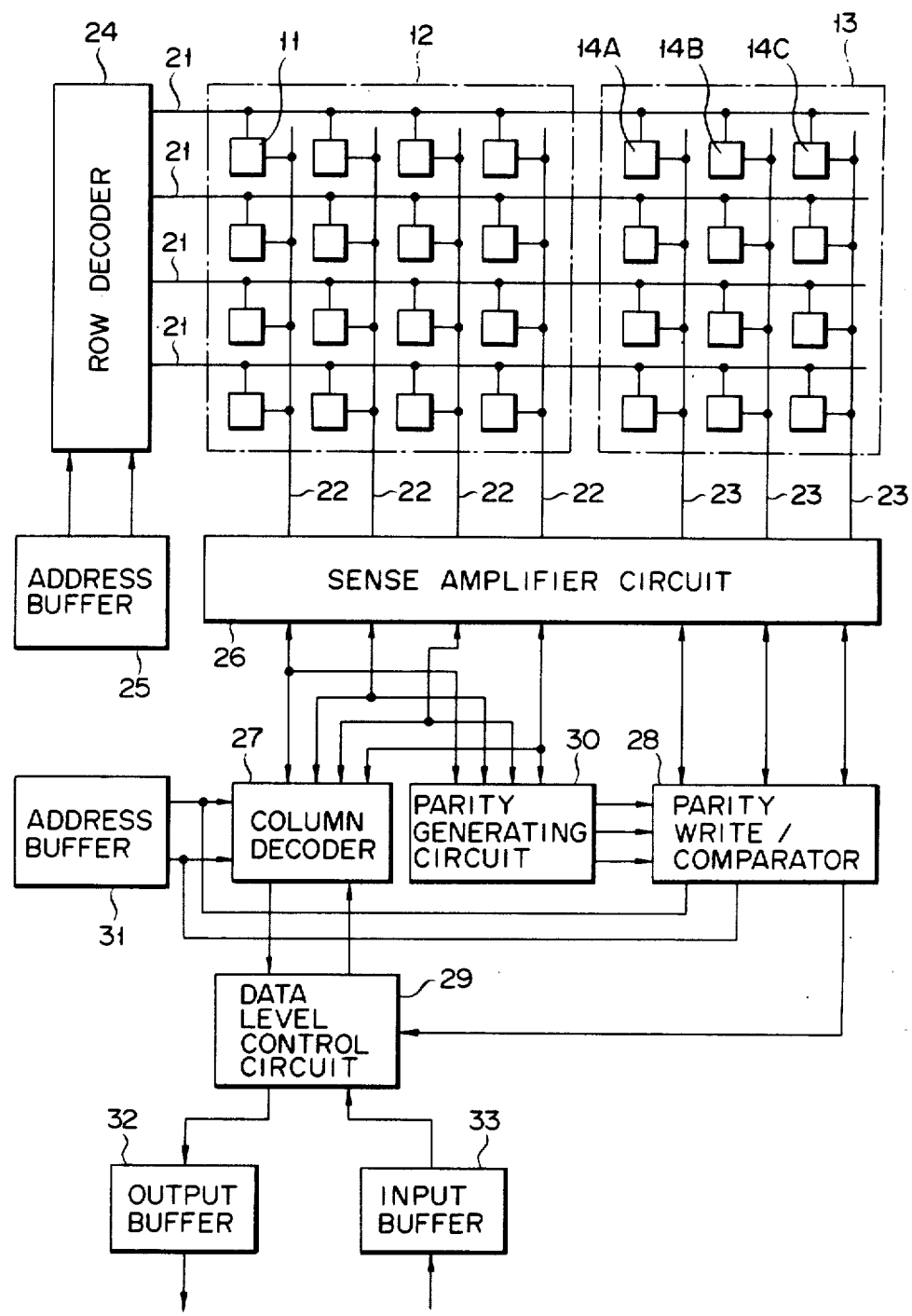
FIG. 5 is a circuit diagram illustrating the details of the FIG. 2 device.

FIG. 5 shows a circuit diagram illustrating in detail the FIG. 2 embodiment.

In the memory cell array 12, four data cells 11 arrayed in one row and three parity storage cells 14A–14C similarly arrayed are correspondingly connected together to one of the single word lines 21. The four data cells 11 arrayed in one column in the memory cell array 12 are correspondingly connected together to one of four bit lines 22. Similarly, in the parity memory circuit 13, each one of the three columns of parity storage cells 14A to 14C has each of the four parity storage cells 14 in that column correspondingly connected together to one of three bit lines 23.

Any of the four word lines 21 is selected according to the output signal from a row decoder 24. The select operation of the row decoder 24 is under control of an address buffer 25 containing data defining the row address for the column and row addresses X and Y.

The four bit lines 22 connected to the memory cell array 12 and the three bit lines 23 connected to the parity memory circuit 13 are respectively connected to sense amplifiers (not shown) contained in a sense amplifier circuit 26. Incidentally, the number of the sense amplifiers is equal to those bit lines, and is "7" in this embodiment.

The sense amplifier circuit 26 holds the data stored in the selected row in the four data cells 11 and the three parity storage cells 14A to 14C, these cells being connected together to a single word line 21 as selected by the row decoder 24, and further holds the data for the data writing into these data and parity storage cells. For reading out data from the data cells 11, a column decoder 27 supplies the write data for the four data cells 11 to the sense amplifier circuit 26. Further, a parity write/comparator 28 supplies the write parity for the three parity storage cells 14 to the sense amplifier circuit 26. Then, the data or the parity bits are respectively written into the cells 11 or 14.

In reading out data from the memory cells 11, the data are read out from the four data cells 11. Only one bit of the data held in the sense amplifiers of the sense amplifier circuit 26 is selected by the column decoder 27, and then supplied to a data level control circuit 29. For reading out the parity bits from the parity storage cells 14, the data are read out from the three parity storage cells 14 in the same selected row. The four data bits held in the sense amplifiers in the sense amplifier circuit 26 are all supplied to a parity generating circuit 30.

The select operation of the column decoder 27 is controlled by the output signal from the address buffer containing data defining the column address for the column and row addresses X and Y.

The parity generating circuit 30 generates the three parity generated bits using the supplied four bits of data, and supplies the parity generated bits to a parity write/comparator 28. In a write mode of the memory cell array 12, the parity write/comparator 28 supplies the three parity bits as generated by the parity generating circuit 30 to the three sense amplifiers in the sense amplifier circuit 26, thereby to write parity storage bits into the parity memory circuit 13. In a read mode of the memory cell array 12, the three parity bits from the parity generating circuit 30 are respectively compared with the three parity storage bits held in the three sense amplifiers of the sense amplifier circuit 26. As a result of this parity check, if a bit error is found in the output data from the column decoder 27, the parity write/comparator 28 directs the data level control circuit 29 to invert the level of the data, and generates the address of the memory cell 11 containing the bit error and supplies this address to the column decoder 27. Therefore, the output buffer 32 supplied with the output from the data level control circuit 28 produces the data at a correct level to the exterior. Further, the data which is level-inverted into the correct level by the data level control circuit 29, is supplied to the original sense amplifier 26 corresponding to the address of the memory cell malfunctioning from the bit error. Subsequently, the data in that memory cell is also corrected.

An input buffer 33 is externally supplied with write data for each of the memory cells 11 in the memory cell array 12. The output data from the input buffer 33 is applied to the corresponding sense amplifier in the sense amplifier circuit 26, by way of the data level control circuit 29 and the column decoder 27, and then is stored in one memory cell 11 in the memory cell array 12 in the manner as mentioned above.

It should be understood that the present invention is not limited to the above-mentioned embodiments, but it may variously be modified and changed within the scope of the present invention. In the above-mentioned embodiment, stored into the parity storage cells 14B and 14C at the 1st and the 2nd parity storage bits in the parity memory circuit 13 are the parity bits for the cell data in the two data cells 11 in the selected row in which the $X_1$ or $X_2$ address bit in the address X=(x1, x2) is set at the "1" level. Alternatively, the parity bits corresponding to the data in the two data cells for which the $X_1$ or $X_2$ address bit of the address X=(x1, x2) is set at logical "0" may be stored into the parity storage cells 14B and 14C.

Further, the memory capacity of the memory cell array 12 may be set at any capacity, not 16 bits, if necessary. In this case, it is necessary to increase or decrease the number of bits in each one of the sets of the parity storage cells 14 of the parity memory circuit 13 according to the memory capacity as selected.

What is claimed is:

1. A semiconductor memory device with a bit error detecting function comprising:
   a data memory circuit including a plurality of data cells which are arrayed in rows and columns in a matrix fashion, said plurality of data cells respectively having row and column addresses each expressed by a plurality of bits;
   a first parity memory circuit including a plurality of rows of parity storage cells, each row of parity storage cells correspoonding to a different one of the rows of data cells, for storing parity bits which correspond to the parity of data stored in the corresponding row of data cells, said stored parity bits each being specified by the parity of a unique combination of data cells, in that selected bits of the column addresses of each of the data cells in each combination are at a predetermined logical level.

2. A semiconductor memory device according to claim 1, further comprising a second parity memory circuit including a plurality of parity storage cells, each corresponding to a different one of the columns of data cells, for storing column parity bits, each column parity bit corresponding to the parity of data stored in all of the data cells in the corresponding column.

3. A semiconductor memory device with a bit error detecting function comprising:
   a data memory circuit including a plurality of data cells which are arrayed in rows and columns in a matrix fashion, said plurality of data cells respectively having row and column addresses each expressed by a plurality of bits;
   a parity memory circuit including a plurality of first parity storage cells for storing row parity bits which are provided corresponding to the parity of the data stored in the corresponding rows of data cells of the memory cell array, said first parity storage cells each being specified by the parity of a unique combination of data cells, such that selected bits of the column addresses of each of the data cells in each combination are at a predetermined logical level;
   a plurality of second parity storage cells, each second parity storage cell corresponding to one of the columns of data cells, for storing column parity bits, with each column parity bit corresponding to the parity of data stored in all of the data cells in the corresponding column, said second parity storage cells being provided in the parity memory circuit;
   a parity generating circuit for generating, in a write mode of the data memory circuit, row and column parity bits to be stored respectively in said first and second parity storage cells from the data to be written, and for generating, in a read mode, parity bits from the data readout, said parity bits corresponding to said written data, with the parity of each generated row parity bit corresponding to the parity of a unique combination of data cells in the corresponding row of data cells such that the row parity bits indicate which data cell in that row contains erroneous data;
   a parity comparing circuit for comparing, in a read mode of the data memory circuit, the parity bits generated by the parity generating circuit with those stored in the first and second parity storage cells of the parity memory circuit; and
   a data level control circuit for producing the data readout of the data memory circuit with the noninverted level of the read out data, when the result of the comparison by the parity comparing circuit indicates the compared parity bits are coincident with each other, and for producing the data readout of the data memory circuit with its level inverted, when the comparison result indicates noncoincidence.

4. A semiconductor memory device according to claim 3, further comprising data write means for deciding that the read out data in a row of data cells contains as many as two errors when the comparison result indicates noncoincidence, and for writing correct data into as many as two data cells in the row of the data memory circuit from which the erroneous data is read out.

5. A semiconductor memory device with a bit error detecting function comprising:
   a plurality of data cells arrayed in rows and columns for storing bits of data, with each data cell having a unique address comprising a row address identified by a first fixed number of address bits and a column address identified by a second fixed number of address bits;
   a first column of row parity storage cells containing row parity data, with each said row parity cell in the first column containing a parity bit corresponding to the parity of all of the data cells in a corresponding row of the data cell array;
   at least one additional column of row parity storage cells containing row parity data, with the number of additional columns equal to the second fixed number of column address bits, with each said row parity storage cell in each additional column containing a parity bit corresponding to the parity of a unique combination of the data cells in a corresponding row, such that a selected column address bit has a predetermined value in each of the data cells in the unique combination, such that the row parity data in the row parity storage cells indicates which data cell in the corresponding row of data cells contains erroneous data when the corresponding row of data cells contains one bit error;
   a plurality of word lines extending in a horizontal direction, with each word line connected to each of the data cells and row parity storage cells in a row, for selecting the data cells and row parity storage cells in a particular row for reading and writing of data;
   a plurality of bit lines extending in a vertical direction, with each bit line connected to each of the data cells and row parity storage cells in a column, such that data can be read from and written into each of the cells in the particular row selected by the word lines.

6. A semiconductor memory device in accordance with claim 5, and further comprising:
   a row of column parity storage cells containing column parity data, with each said column parity bit corresponding to the parity of the data stored in all of the data cells in a corresponding column of the data cell array, such that the column parity data in the column parity storage cells indicates which data cells contain erroneous data when a row of data cells contains as many as two bit errors;
   an additional plurality of bit lines extending at least partially in a horizontal direction, with each additional bit line connected to one of the column parity storage cells, such that data can be read from and written into each of the column parity storage cells.

* * * * *